United States Patent
Stuart

(10) Patent No.: US 9,288,143 B2
(45) Date of Patent: Mar. 15, 2016

(54) DATA FLOW PATH DETERMINATION

(71) Applicant: HEWLETT-PACKARD DEVELOPMENT COMPANY, L.P, Houston, TX (US)

(72) Inventor: Leslie R. Stuart, Morgan Hill, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 150 days.

(21) Appl. No.: 14/053,150

(22) Filed: Oct. 14, 2013

(65) Prior Publication Data
US 2015/0103672 A1 Apr. 16, 2015

(51) Int. Cl.
*H04L 12/721* (2013.01)
*H04L 12/751* (2013.01)
*H04L 12/26* (2006.01)
*H04L 12/733* (2013.01)
*H04L 12/859* (2013.01)

(52) U.S. Cl.
CPC ............... *H04L 45/38* (2013.01); *H04L 43/10* (2013.01); *H04L 45/02* (2013.01); *H04L 45/122* (2013.01); *H04L 47/2475* (2013.01)

(58) Field of Classification Search
None
See application file for complete search history.

(56) References Cited

U.S. PATENT DOCUMENTS

| | | | | |
|---|---|---|---|---|
| 6,477,572 B1 * | 11/2002 | Elderton et al. | ............... | 709/224 |
| 6,564,258 B1 * | 5/2003 | Uniacke | ................... | H04L 45/02 370/351 |
| 6,956,821 B2 | 10/2005 | Szviatovszki et al. | | |
| 7,168,044 B1 * | 1/2007 | Mao | ......................... | H04L 41/12 370/351 |
| 7,681,130 B1 * | 3/2010 | Lavallee et al. | ................ | 715/735 |
| 8,064,358 B2 * | 11/2011 | Conoboy | .............. | H04L 41/082 370/252 |
| 8,392,608 B1 | 3/2013 | Miller et al. | | |
| 2003/0046390 A1 * | 3/2003 | Ball et al. | ........................ | 709/224 |
| 2003/0115319 A1 * | 6/2003 | Dawson | .............. | H04L 12/2697 709/224 |
| 2003/0128231 A1 * | 7/2003 | Kasriel et al. | ................... | 345/736 |
| 2003/0137532 A1 * | 7/2003 | Proulx et al. | ................... | 345/735 |
| 2004/0061701 A1 * | 4/2004 | Arquie | .................... | H04L 41/12 345/440 |
| 2006/0182034 A1 * | 8/2006 | Klinker et al. | ................ | 370/238 |
| 2007/0258368 A1 | 11/2007 | Dickerson et al. | | |
| 2009/0077478 A1 * | 3/2009 | Gillingham | ......... | H04L 41/0803 715/763 |
| 2010/0040366 A1 | 2/2010 | Jenkins et al. | | |
| 2013/0028091 A1 * | 1/2013 | Sun | ........................ | G06F 9/5083 370/236 |
| 2013/0064079 A1 * | 3/2013 | Zhang | ................... | H04L 43/026 370/230 |
| 2014/0086065 A1 * | 3/2014 | DeCusatis | ............. | H04L 45/128 370/242 |
| 2015/0012621 A1 * | 1/2015 | Patwardhan | ........ | H04L 41/0803 709/220 |

OTHER PUBLICATIONS

VNEXT, Graphical Interface Usage, 2011, http://www.gta.ufrj.br/vnext/index.php/manual/use-gui?start=3.

* cited by examiner

*Primary Examiner* — Brian Roberts
(74) *Attorney, Agent, or Firm* — FabianVanCott

(57) ABSTRACT

A method of determining a data flow path within a computing network includes, with the processor executing a data flow path determination module, determining a number of data flow paths between a first node and a second node within the computing network, and with a with the processor executing a graphical user interface (GUI) module, displaying the data flow paths to a user.

19 Claims, 6 Drawing Sheets

DATA FLOW PATH DETERMINATION

BACKGROUND

A software-defined networking (SDN) manager in a network builds a path through the network to allow a number of devices to connect with other devices within the network. Once the SDN manager builds a path through the network, the SDN manager makes decisions about where network traffic is sent by instructing switches within the network to forward packets of data traveling across the network between the devices. As a result, the devices are connected to the other devices.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

SDN networks utilize applications tied to a controller within a network to program data flows through the network. The applications utilize application program interfaces (APIs) and other interlaces to communicate with the controller. Although there may exist instances were an SDN network is utilized where no applications are present, a desire to benefit from an SDN network may still exist. Further, there are network environments that do not have developers that can utilize the programmatic interface of the controller. The present SDN manager, in relation to the above, abstracts the programmatic interface of the controller, and provides a number of graphical user interfaces (GUIs) to program the controller and create network paths within the network.

The SDN manager builds a path through a network, and makes decisions about where and how network traffic is sent by instructing switches or other computing devices within the network to forward packets of data traveling across the network between the nodes within the network. In some circumstances, a user may desire an optimized data transfer path to be built by the SDN manager in order to provide for a desired or required bandwidth within that data transfer path. In another circumstance, a user may desire a shortest data flow path with the least amount of hops between two nodes. Thus, the present SDN manager provides for the creation of data flow paths within the network based on a user-desired or user-selected data flow path goal.

As used in the present specification and in the appended claims, the term "node" is meant to be understood broadly as any interconnection point within a computer network. For example, a node may be a possessing device, a controller, a core, a switch, a router, a server device, client devices, printers, or a computing device, among may other types of hardware devices within the network, and combinations thereof.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
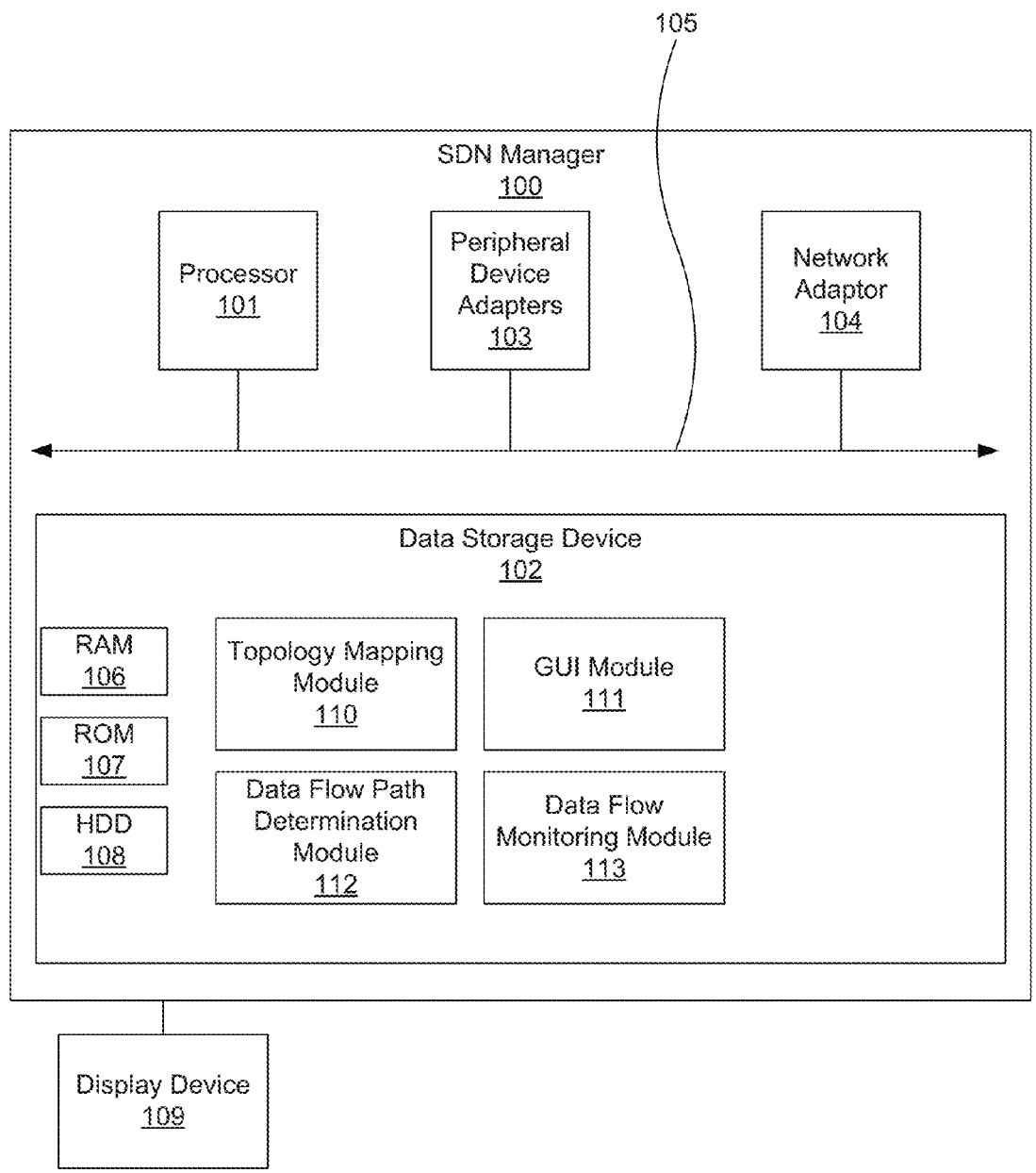
FIG. 1 is a block diagram of a software-defined network (SDN) manager, according to one example of the principles described herein.

Turning now to the figures, FIG. 1 is a block diagram of a software-defined network (SDN) manager, according to one example of the principles described herein. The SDN manager (100) may be implemented in an electronic device. Examples of electronic devices include servers, desktop computers, laptop computers, personal digital assistants (PDAs), mobile devices, smartphones, gaming systems, and tablets, among other electronic devices.

The SDN manager (100) enables network architects or other users to design and create end-to-end paths through a SDN domain using a map of the topology of the network. The map of the topology is displayed to the user via a number of graphical user interfaces (GUIs). The paths created using the SDN manager (100) is achieved through the GUIs provided by the SDN manager (100). Each path displayed within the GUI of the mapped topology represents a data path in hardware from two or more nodes in the SDN domain.

In one example, data flow paths may be manually created by selecting, via the GUIs, nodes from the topology map. In another example, data flow paths may be automatically created by the SDN manager (100). In this example, the SDN manager (100) selects two end nodes from the topology map. In one example, the SDN manager (100) selects the two end nodes based on user input. In another example, the user selects the end nodes via the GUIs. In this example of automatic data flow path creation, the GUI displays to the user an option of choosing an "optimized data flow path" or a "shortest data flow path." An optimized data flow path is defined by a data flow path within the network with the most bandwidth available. A shortest data flow path is defined by a data flow path within the network with the fewest hops between the two selected end nodes.

In one example, the paths may be automatically and continuously monitored. This monitoring may be performed to audit security within the network and the hardware devices. Monitoring may also be used to ensure isolation of a data flow path through the network. In most cases, a data flow path may not overlap or intersect another data flow path. If data flow paths were permitted to overlap or intersect, data integrity may be compromised and result in a voiding of multi-tenancy requirements where two individual tenants are not allowed to accesses another tenant's data flows through the network. Monitoring may also be performed to ensure that service level agreements (SLAs) are being met, and to ensure that overall infrastructure capacity loading is being accomplished.

The SDN manager (100) may be utilized in any data processing scenario including, stand-alone hardware, mobile applications, through a computing network, or combinations thereof. Further, the SDN manager (100) may be used in a computing network, a public cloud network, a private cloud network, a hybrid cloud network, other forms of networks, or combinations thereof. In one example, the methods provided by the SDN manager (100) are provided as a service over a network by, for example, a third party. In this example, the service may comprise, for example, the following: a Software as a Service (SaaS) hosting a number of applications; a Platform as a Service (Paas) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. Further, the present systems and methods may be implemented on a wired network, wireless network, physical network, virtual network, or combinations thereof.

The present systems may be implemented on one or multiple hardware platforms, in which the modules in the system can be executed on one or across multiple platforms. Such modules can run on various forms of cloud technologies and hybrid cloud technologies, or offered as a SaaS (Software as a service) that can be implemented on or off the cloud. In one example, one of the multiple platforms may be the Intelligent Management Center (IMC) network management platform developed and distributed by Hewlett Packard Company. In another example, the methods provided by the SDN manager (100) are executed by a local administrator.

To achieve its desired functionality, the SDN manager (100) comprises various hardware components. Among these hardware components may be a number of processors (101), a number of data storage devices (102), a number of peripheral device adapters (103), and a number of network adapters (104). These hardware components may be interconnected through the use of a number of busses and/or network connections. In one example, the processor (101), data storage device (102), peripheral device adapters (103), and a network adapter (104) may be communicatively coupled via a bus (105).

The processor (101) may include the hardware architecture to retrieve executable code from the data storage device (102) and execute the executable code. The executable code may, when executed by the processor (101), cause the processor (101) to implement at least the functionality of determining a number of data flow paths between a first node and a second node within a computing network, displaying the data flow paths to a user via a number of graphical user interfaces (GUIs), and utilizing a selected data flow path as the data flow path through which the first node and a second node communicate, according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein.

The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

Generally, the data storage device (102) may comprise a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the SDN manager (100) enable the processor (101) to interface with various other hardware elements, external and internal to the SDN manager (100). For example, the peripheral device adapters (103) may provide an interface to input/output devices, such as, for example, display device (109), a mouse, or a keyboard. The peripheral device adapters (103) may also provide access to other external devices such as an external storage device, a number of network devices including, for example, servers, switches, and routers, client devices, other types of computing devices, and combinations thereof that exist within the network.

The display device (109) may be provided to allow a user of the SDN manager (100) to interact with and implement the functionality of the SDN manager (100). The peripheral device adapters (103) may also create an interface between the processor (101) and the display device (109), a printer, or other media output devices. The network adapter (104) may provide an interface to other computing devices within, for example, a network, thereby enabling the transmission of data between the SDN manager (100) and other devices located within the network.

The SDN manager (100) may display the number of graphical user interfaces (GUIs) on the display device (109) associated with the executable program code representing the number of applications stored on the data storage device (102). The GUIs may include aspects of the topology of the network including a number of devices within the network, communication links between the devices, and a number of data flow paths between a number of nodes within a network. The GUIs may further display a selected data flow path as the data flow path through which a first node and a second node communicate, according to the methods of the present specification described herein.

By making a number of interactive gestures on the GUIs of the display device (109), a user may select a number of nodes between which a user desires to create a data flow path. Additionally, via making a number of interactive gestures on the GUIs of the display device (109), a user may select an optimized data flow path between the number of nodes. The optimized data flow path defines a data flow path within the network with the most available bandwidth. The optimized data flow path is determined based on bandwidth requirements of a number of applications executed within said network. The user may also select a shortest data flow path, the shortest data flow path defining a data flow path within the network with the least amount of hops between a first node and a second node.

Examples of display devices (109) include a computer screen, a laptop screen, a mobile device screen, a personal digital assistant (PDA) screen, and a tablet screen, among other display devices (106). Examples of the GUIs displayed on the display device (109) will be described in more detail below.

The SDN manager (100) further comprises a number of modules used in the implementation of determining a number of data flow paths between a first node and a second node within a computing network, displaying the data flow paths to a user via a number of graphical user interfaces (GUIs), and utilizing a selected data flow path as the data flow path through which the first node and a second node communicate, according to the methods of the present specification described herein. The various modules within the SDN manager (100) comprise executable program code that may be executed separately. In this example, the various modules may be stored as separate computer program products. In another example, the various modules within the SDN manager (100) may be combined within a number of computer program products; each computer program product comprising a number of the modules.

In still another example, the modules may be, instead, embodied as a number of data processing engines, a number of application-specific integrated circuits (ASICs), or other processing devices that perform the functionality described herein with regard to the various modules. In this example, the processing devices may be coupled to the various hardware devices within the SDN manager (100) in order to perform their functionality. However, the present SDN manager (100) will be described herein as comprising a number of modules.

The SDN manager (100) may include a topology mapping module (110) to, when executed by the processor (101), discover and identify a number of hardware computing devices within a computing network. As described herein, the hardware computing devices may include, for example, a processing device, a controller, a core, a switch, a router, a server device, or a computing device, among many other types of hardware devices that may exist within a network.

The SDN manager (100) may also include a GUI module (111) to, when executed by the processor (101), display the topology as discovered and identified by the topology mapping module (110) on the display device (109) to a user. In this manner, the GUI module (111) provides a user-intelligible representation of the topology of the network and the communication links between the nodes within the topology.

The SDN manager (100) may further include a data flow path determination module (112) to, when executed by the processor (101), determine a number of data flow paths between a number of nodes with the computing network. In one example, the data flow path determination module (112) may determine all possible data flow paths between all nodes with the computing network. In another example, the data flow path determination module (112) may determine an optimized data flow path between a number of nodes within the computing network. In this example, the data flow path determination module (112) may use data related to the execution of a number of applications within the network to determine the optimized data flow path as will be described in more detail below. In another example, the data flow path determination module (112) may determine a shortest data flow path within the network. The shortest data flow path is defined by a data flow path within the network with the least amount of hops between a number of nodes.

The GUI module (111) displays the number of data flow paths determined by the data flow path determination module (112) in a number of the GUIs generated by the GUI module (111). The GUI module (111) may display all of the data flow paths, the optimized data flow path, the shortest data flow path, or combinations thereof. In this manner, the GUI module (111) provides a user-intelligible representation of the data flow paths determined by the data flow path determination module (112).

The SDN manager (100) may further include a data flow monitoring module (113) to, when executed by the processor (101), monitor the data flow paths within the computing network. The data flow monitoring module (113) may automatically and continuously monitor the various data flow paths within the computing network including, for example, currently utilized data flow paths, an optimized data flow path, a shortest data flow path, or combinations thereof. As described above, this monitoring may be performed to audit security within the network and the hardware devices. Monitoring may also be used to ensure isolation of a data flow path through the network. In most cases, a data flow path may not overlap or intersect another data flow path. If data flow paths were permitted to overlap or intersect, data integrity may be compromised and result in a voiding of multi-tenancy requirements where two individual tenants are not allowed to accesses another tenant's data flows through the network. Monitoring may also be performed to ensure that service level agreements (SLAs) are being met, and to ensure that overall infrastructure capacity loading is being accomplished. The GUI module (111) may display a number of data flow paths being monitored and their status.

Figure 2:
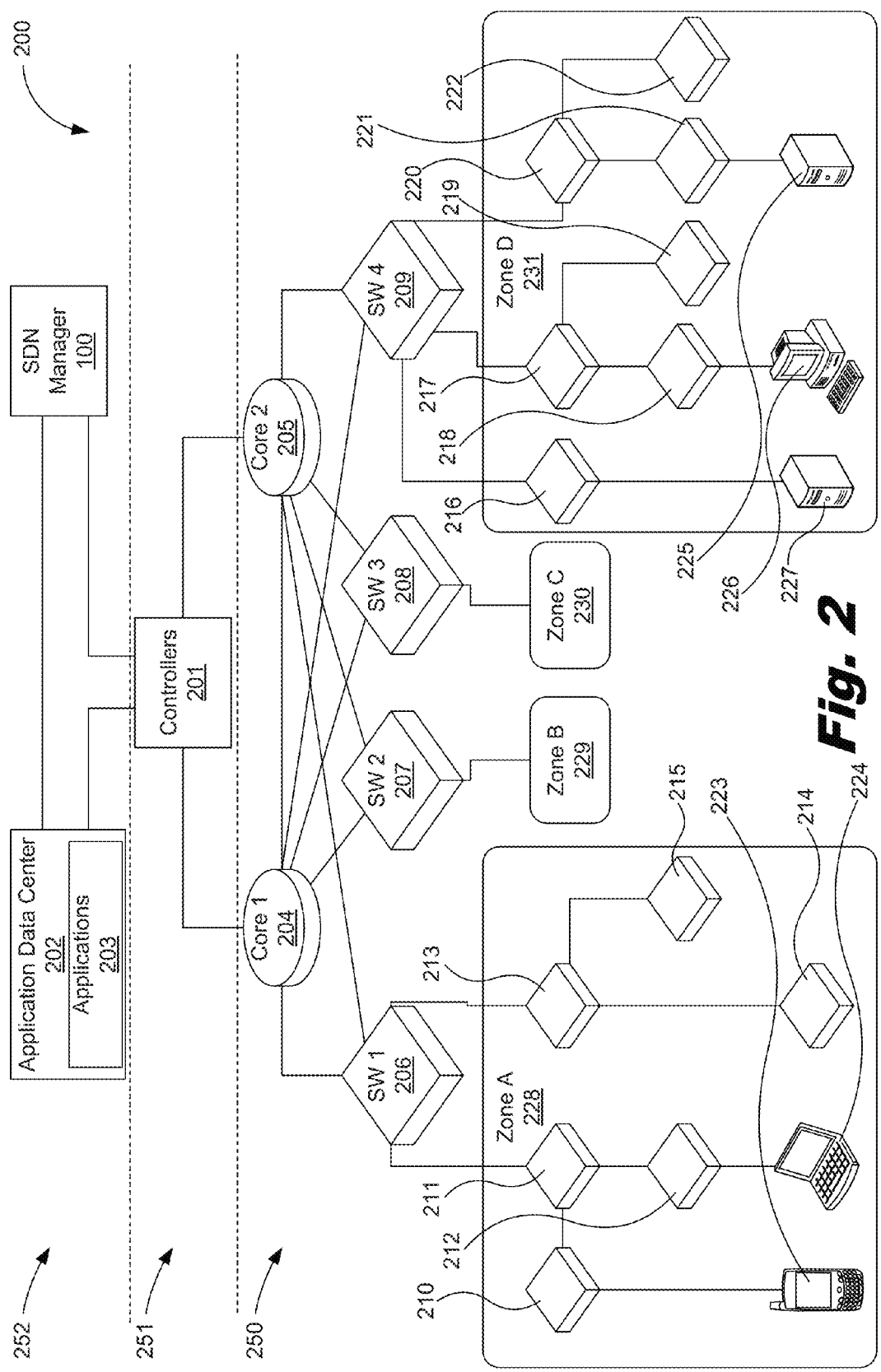
FIG. 2 is a block diagram of a network managed by the SDN manager of FIG. 1, according to one example of the principles described herein.

FIG. 2 is a block diagram of a network (200) managed by the SDN manager (100) of FIG. 1, according to one example of the principles described herein. The network (200) of FIG. 2 is an example of a network in which the SDN manager (100) operates. The SDN manager (100) may operate in any network of hardware devices. The SDN manager (100) manages SDNs and other types of networking environments. The SDN manager (100) provides the ability to easily create data flow paths. In this manner, the network may be programmed without programming experience or resources. This, in turn, furthers the adoption of SDNs in all types of network environments including, for example, datacenters and campus networking environments.

The network (200) of FIG. 2 may comprise a network layer (250), a controller layer (251), and an application layer (252). In the example of FIG. 2, the network layer (250) comprises a number of cores (204, 205) a number of switches (206 through 222), and a number of computing devices (223 through 227). A number of switches (210 through 223) representing switches 5 through 17, respectively, may be identified as being included within a number of zones (228, 229, 230, 231). The zones (228, 229, 230, 231) provide for a user-friendly way to understand and represent areas within the network (200). Examples of switches may include, for example, a switch that uses an OPENFLOW communications protocol developed and distributed by the Open Networking Foundation, a virtual switch (vSwitch), a physical switch (pSwitch), or a wireless local area network access point (WLAN AP), among other types of switches and routers.

As will be discussed in more detail below, the zones may be represented within a GUI generated by the GUI module (111) to assist a user in identifying the various nodes (201 through 227) within the network (200). Further, as will described in more detail below, the zones (228, 229, 230, 231), when represented in a GUI, may be user-selectable and expanded to show those nodes that exists within a selected zone. As depicted in FIG. 2, zone B (229) and zone C (230) are depicted in a collapsed manner. However, although not depicted, zone B (229) and zone C (230) also comprise a number of nodes that make up part of the network (200).

Further, although a number of switches (206 through 222) are depicted in the network (200) of FIG. 2, any type of hardware device may be included as intermediary hardware elements. The computing devices (223 through 227) of the network may be any type of hardware device. In one example, the computing devices (223 through 227) may be located on an edge or terminal of the network (200).

The hardware devices (204 through 227) of the network layer (250) of the network (200) are coupled to a number of controllers (201) located in the controller layer (251) of the network (200). The controllers (201) instruct the switches (206 through 222) were to send the data that is to be transmitted through the network.

The controllers (201) are coupled to an application data center (202) that stores a number of applications (203) to be executed by the computing devices (223 through 227). The application data center (202) is located on the application layer (252) of the network. The applications (203) may include any application that is used to transmit data from one computing device (223 through 227) to another computing device within the network (200). An example of an application is LYNC messaging application developed and distributed by Microsoft Corporation. LYNC allows for instant messaging, voice over internet protocol (VOIP), and video conferencing. These features of LYNC are bandwidth demanding, and if a data flow path within the network (200) is not chosen to have an adequate amount of bandwidth with respect to the features of LYNC being utilized by the computing devices (223 through 227), the user's experience with the application will be diminished. LYNC will be used as an example herein of an application (203) executed on the network (200) and computing devices (223 through 227).

The applications (203) stored on the application data center (202) utilize the network to transmit data between a number of the computing devices (223 through 227). As will be described in more detail below, the SDN manager uses information associated with the applications (203) in order to provide data flow paths through the network (200) that meet a number of requirements of the applications (203) and ensure a level of quality in the transfer of data between the computing devices (223 through 227).

In one example, the SDN manager (100), although being coupled to all layers (250, 251, 252) of the network (200), is not considered part of any of the layers (250, 251, 252). The SDN manager (100) communicates with and manages any number of hardware devices in the network level such as, for example, controllers, routers, switches, servers, client devices, printers, and modem racks, among many other forms of hardware devices, and may do so either directly or indirectly through another computing device such as, for example, the controllers (201). In one example, the SDN manager (100) communicates with the hardware devices in the network layer (250) of the network (200) using simple network management protocol (SNMP). SNMP is a protocol for managing devices on networks. In this manner, the SDN manager (100) communicates with and manages any device that supports SNMP.

In another example, the SDN manager (100) communicates with and controls the hardware devices in the network layer using a command-line interface (CU). A CLI provides interaction with a computer program stored an executed by the hardware devices where the user issues commands to the program in the form of successive lines of text called command lines. Thus, the SDN manager (100) communicates with and manages any device that supports CLI.

The SDN manager (100) communicates with and manages the controllers (201) using a representational state transfer (REST) interface. REST is a programmatic access methodology and software architectural style for distributed hypermedia systems like the World Wide Web. REST may execute any interface that uses extensible markup language (XML) markup language, YAML human-readable data serialization format, JavaScript object notation (JSON) scripting language, or plain text over hypertext transfer protocol (HTTP) without an additional messaging layer such as simple object access protocol (SOAP). In this manner, the SDN manager (100) communicates with and manages any device that supports REST including, for example, the controllers (201).

The SDN manager (100) also communicates with, manages, and provides adequate bandwidth within the network (200) for the applications (203) within the application data center (202) using REST.

In one example, the SDN manager (100) may obtain information regarding the applications (203) from the controller (201), which either has that information, or obtains that information from the applications (203). This is performed using the REST interface protocol. In another example, the SDN manager (100) obtains the information regarding the applications (203) directly from the applications (203). This may be performed using the REST interface protocol, or, depending on the application (203), with JAVA computer programming language developed and distributed by Oracle Corporation or PYTHON computer programming language developed and distributed by Python Software Foundation, among other types of programming languages.

Figure 3:
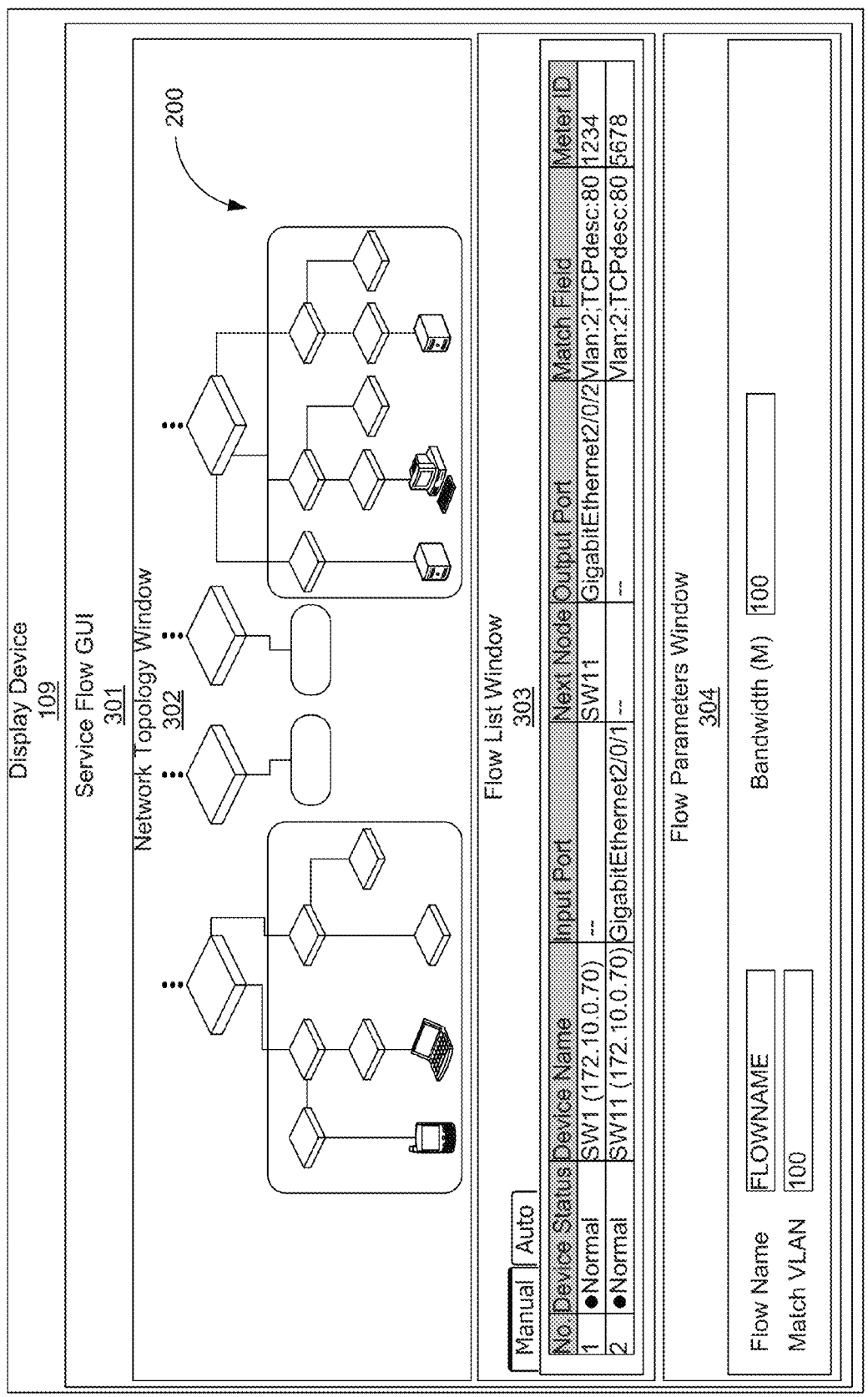
FIG. 3 is a block diagram of a service flow graphical user interface (GUI) displayed on a display device of the SDN manager of FIG. 1, according to one example of the principles described herein.

As described above, the SDN manager (100), by executing the GUI module (111), displays a number of GUIs on the display device (109) of the SDN manager (100) by executing, for example, the topology mapping module (110) and the GUI module (111). FIG. 3 is a block diagram of a service flow graphical user interface (GUI) (301) displayed on a display device (109) of the SDN manager (100) of FIG. 1, according to one example of the principles described herein. The service flow graphical user interface (GUI) (301) comprises a network topology window (302) that displays the topology of the network. In the example of FIG. 3, the network whose topology is displayed is the topology of the network (200) of FIG. 2. In one example, the zones (228, 229, 230, 231) depicted in FIG. 2 and reproduced in the network topology window (302) of FIG. 3, may be user-selectable. In this example, when a zone (228, 229, 230, 231) is selected, an expanded view is presented to the user. An expanded view may be presented as are Zone A (228) and Zone D (231) are depicted in FIG. 2, and as opposed to Zone B (229) and Zone C (230) which are depicted in a collapsed view. In this manner, the user may be able to identify and view the switches and other computing devices in a particular zone (228, 229, 230, 231) without making the network topology window (302) cluttered or otherwise difficult to view.

The service flow graphical user interface (GUI) (301) further comprises a flow list window (303) that displays a number of data flows within the network (200) displayed in the network topology window (302). As depicted in FIG. 3, a number of entries may be depicted in a table format to a user that informs the user of a number of data flows between nodes within the network (200). In each row of the table, the information conveyed within the flow list window (303) may include, for example, a flow number for a number of data flows, a status of a number of devices, and a number of device names that identify the device that is represented in each of the rows. The table depicted in the flow list window (303) may also include information regarding an input port of each of the devices, a next node with which the node identified in a row is communicating with, an output port of each of the devices, and a match VLAN field that informs a user as to whether the VLAN fore selected data flow matches a VLAN configured on a physical device.

The service flow graphical user interface (GUI) (301) further comprises a flow parameters window (304) that provides a user with information regarding a flow selected within the flow list window (303). Information of the parameters of the selected data flow may include, for example, a flow name, a match VLAN, and an amount of bandwidth available within the data flow path measured in, for example, megabytes, among other parameters of the data flow within the network (200).

A "manual" tab and an "auto" tab may be presented to the user. The tabs, when selected by a user via the service flow GUI (301), display manually created and automatically created data flow paths within the network (200). When the manual tab is selected by a user, the user may select a number of nodes represented in the network topology window (302) that connect two computing devices (FIG. 2, 223 through 227). For example, if the network (200) were displayed to a user in the network topology window (302), and the user wanted to communicatively connect computing device (223) to computing device (226), the user would be allowed to select a number of nodes that bridge computing device (223) to computing device (226). For example, the user could, with a item selection device such as a mouse or keyboard, select the following nodes between computing device (223) and computing device (226): (1) switch 5 (210), (2) switch 6 (211), (3) switch 1 (206), (4) core 1 (204), (5) core 2 (205), (6) switch 4 (209), (7) switch 12 (217), and (8) switch 13 (218). In this manner, the user may dictate which path through the network (200) the data is to flow.

The flow list window (303) displays each of the nodes within the series of user-selected nodes that connect the computing device (223) to computing device (226). In this manner, the user can identify what nodes within the network (200) he or she has selected. The flow parameters window (304) will also display the flow parameters of the data flow path that the user selects via the network topology window (302). In one example, the flow parameters displayed to the user in the flow parameters window (304) are adjusted as the user adds nodes to the data flow path as he or she selects the nodes. In this manner, the user may identify how the parameters of the data flow path change as nodes are added or subtracted from the data flow path.

Figure 4:
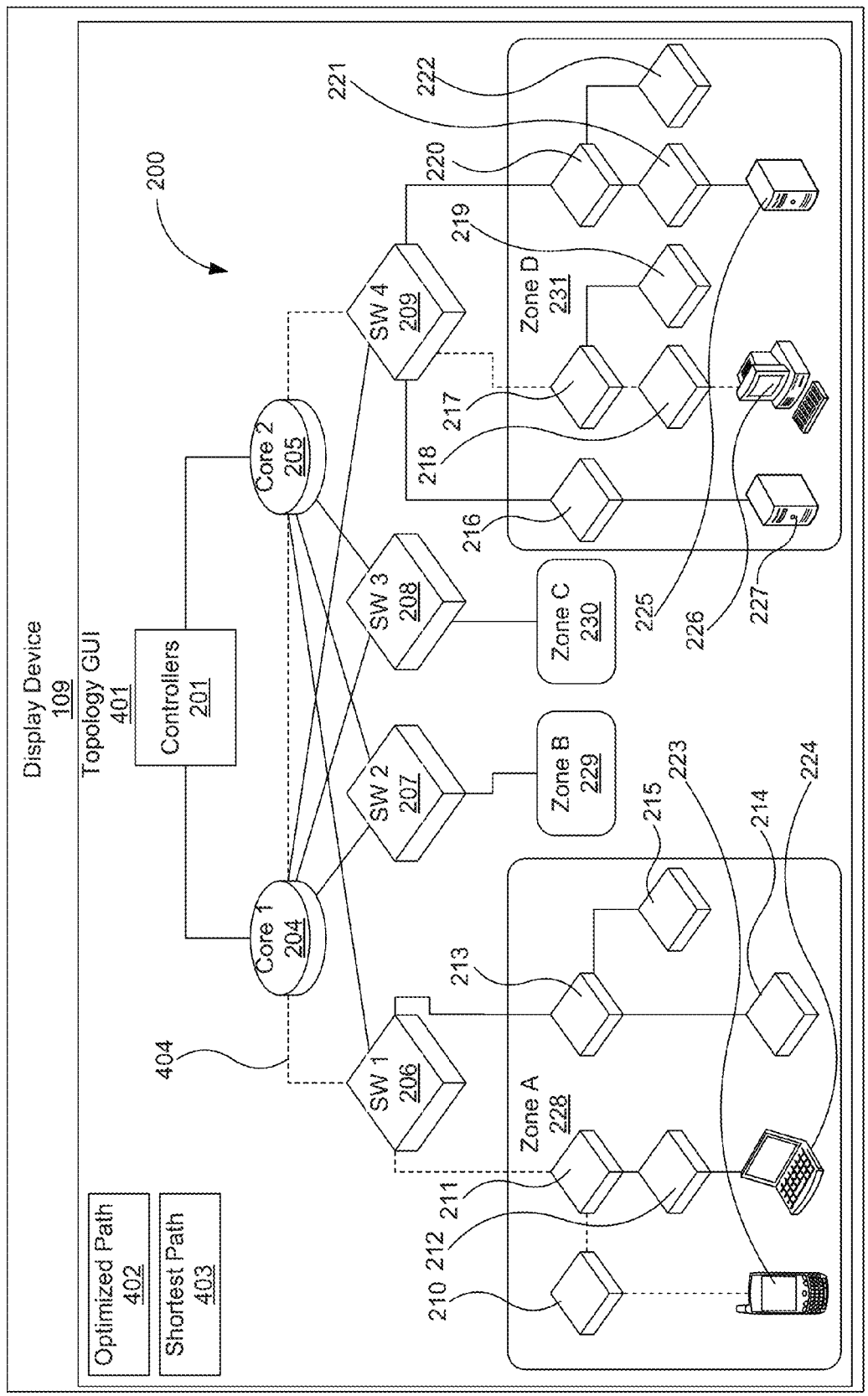
FIG. 4 is a block diagram of a topology GUI displayed on a display device of the SDN manager of FIG. 1, according to one example of the principles described herein.

If a user selects the "auto" tab of the flow list window (303), the display device allows or prompts the user to select two nodes such as, for example, computing devices (223 through 227) or any other two devices within the network (200). For example, in continuation of the above example regarding manual selection of nodes, the user may select computing device (223) and computing device (226) as the two devices between which the user wishes to create a data flow path. Once the two nodes are selected, the topology GUI (401) of FIG. 4. FIG. 4 is a block diagram of a topology GUI (401) displayed on a display device (109) of the SDN manager (100) of FIG. 1, according to one example of the principles described herein.

The topology GUI (401) will display the topology of the network (200) of FIG. 2, along with an auto-generated data flow path (404) between the selected nodes, e.g., computing device (223) and computing device (226). An example of an automatically-generated data flow path is depicted in the representation of the topology of the network (200) in the topology GUI (401) as a dashed line between computing device (223) and computing device (226) and a number of intermediary nodes there between.

A number of buttons (402, 403) may be presented to the user to allow the user to select a type of automatically-determined data flow path within the network (200). For example, an "optimized path" button (402) and a "shortest path" button (403) may be presented to the user for user selection. If the user selects the shortest path button (403), then the SDN manager (100), executing the data flow path determination module (112), will generate a data flow path between computing device (223) and computing device (226) that includes the fewest amount of hops, or, in other words, the lowest hop count. A hop may be defined as one segment of a transmission path between adjacent nodes in a routed network. Thus, a hop count may be defined as a measure of the links between two nodes within a network. A hop count of five means that four nodes separate the source and destination devices. Thus, the shortest path between computing device (223) and computing device (226), assuming the data flow path (404) depicted in dashed lines in FIG. 4 is the shortest data flow path, then the hop count between computing device (223) and computing device (226) is nine, with eight intermediary nodes.

If the user selects the optimized path button (402), then the SDN manager (100), executing the data flow path determination module (112), determines an optimized data flow path is represented as the data flow path (404) in the topology GUI (401). The data flow path determination module (112) may take a number of parameters into consideration when determining the optimized data flow path through the network (200). One parameter the flow path determination module (112) may consider is the data flow requirements of a number of applications being executed between the two user-selected nodes the user desires to communicate between. As described above, the controllers (201) are coupled to an application data center (202) that stores a number of applications (203) to be executed by the computing devices (223 through 227). The applications (203) may include any application that is used to transmit data from one computing device (223 through 227) to another computing device within the network (200). An example of an application is LYNC messaging application described above. The various features of LYNC are bandwidth demanding, and if a data flow path within the network (200) is not chosen to have an adequate amount of bandwidth with respect to the features of LYNC being utilized by, for example, computing device (223) and computing device (226), the user's experience with the application will be diminished.

The SDN manager (100) uses information associated with the applications (203) in order to provide an optimized data flow path (404) through the network (200) that meets a number of requirements of the applications (203) and ensure a level of quality in the transfer of data between the computing devices (223 through 227). In the example of LYNC, the SDN manager (100), executing the data flow path determination module (112), receives a number of bandwidth requirements defined by the LYNC application. Based on these bandwidth requirements, the data flow path determination module (112) will consider the data transfer capabilities of a number of the nodes within the network (200), calculations of the available bandwidth between the nodes (201 through 227) within the network (200), and the bandwidth requirements defined by the application being used to transfer data. Using this information, the data flow path determination module (112) generates an optimized data flow path (404). In one example, the data flow path determination module (112) determines an optimized data flow path with the most bandwidth or the greatest data transfer speed. The generated optimized data flow path (404) may be presented to the user in the topology GUI (401) of FIG. 4.

Further, the status of the selected shortest data flow path or optimized data flow path may be monitored by the SDN manager (100) executing the data flow monitoring module (113). In one example, the flow parameters window (304) of FIG. 3 and its information may be displayed to the user in either the service flow GUI (302) of FIG. 3 or the topology GUI (401) of FIG. 4. Information regarding the status of the data flow path (404) such as, for example, the bandwidth through the data flow path (404), and the status of a number of nodes (201 through 227) within the network (200).

Figure 5:
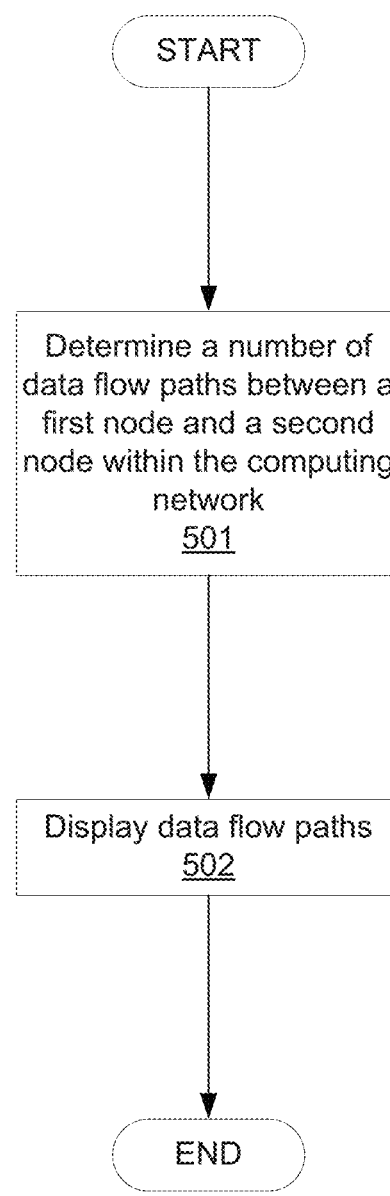
FIG. 5 is a flow chart showing a method determining a number of data flow paths within a computing network using an SDN manager, according to one example of the principles described herein.

FIG. 5 is a flow chart showing a method determining a number of data flow paths (404) within a computing network using an SDN manager (100), according to one example of the principles described herein. The method of FIG. 5 may begin by, with the processor (101) of the SDN manager (100) executing the data flow path determination module (112), determine (block 501) a number of data flow paths between a first node and a second node within the computing network. The processor (101) SDN manager (100) displays (block 502) the data flow paths to a user via the display device (109) by the processor (101) executing the graphical user interface (GUI) module (111). In this manner, a number of data flow paths may be generated and displayed to a user. The method of FIG. 5 will now be described in more detail in connection with FIG. 6.

Figure 6:
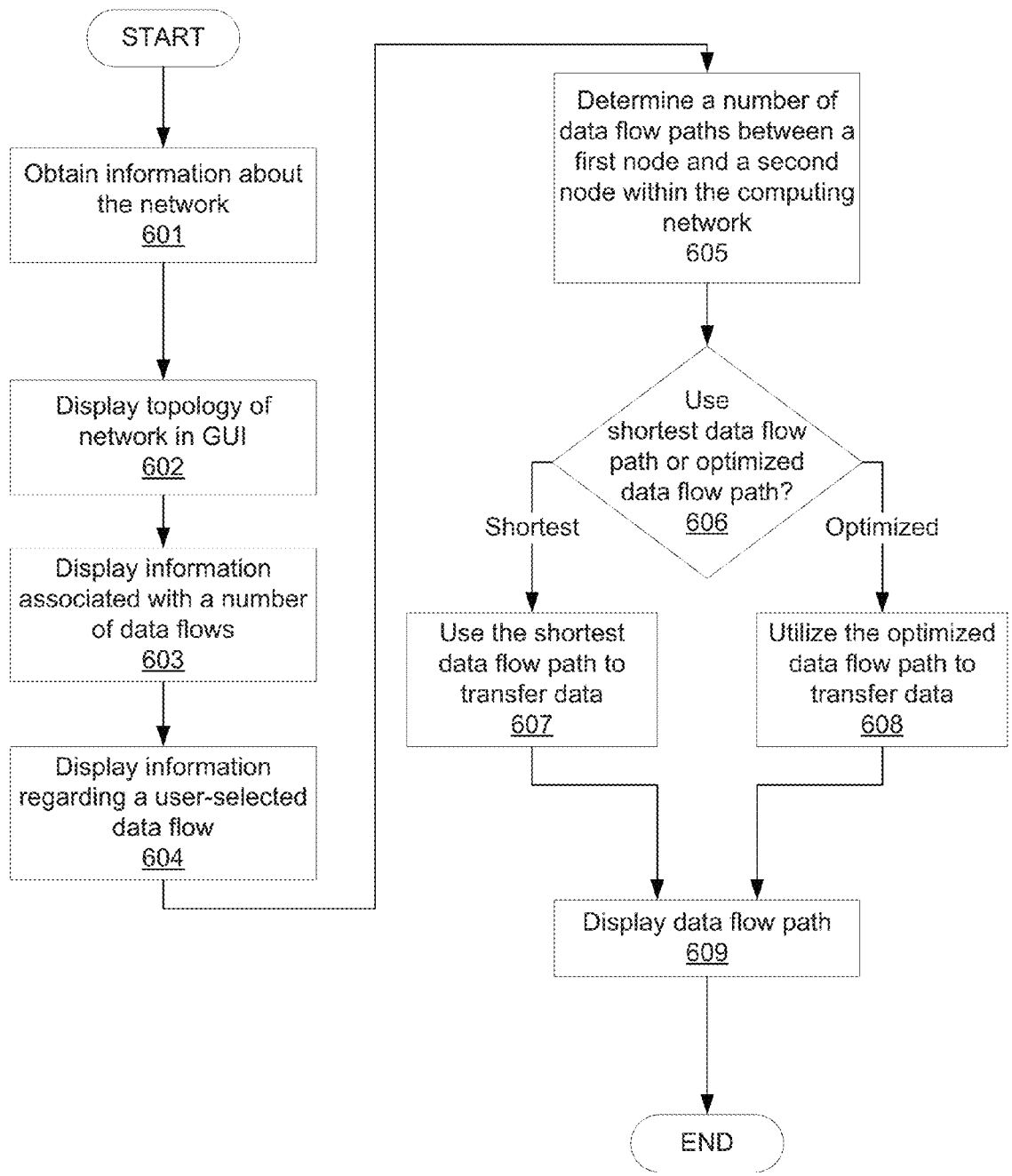
FIG. 6 is a flow chart showing a method determining a number of data flow paths within a computing network using an SDN manager, according to another example of the principles described herein.

FIG. 6 is a flow chart showing a method determining a number of data flow paths (404) within a computing network using an SDN manager (100), according to another example of the principles described herein. The method of FIG. 6 may begin by obtaining (block 601) information about the network (200) analyzed by the SDN manager (100). Block 601 may be performed by the processor (101) of the SDN manager (100) executing the topology mapping module (110). The information obtained by the topology mapping module (110) may include, for example, the number and type of nodes (201 through 227) within the network (200), the relationships between nodes (201 through 227), a number of potential data flow paths within the network (200), the existence of a number of controllers (201), and the existence of a number of applications (203) that may be executed to transfer data between a number of the nodes (201 through 227), among other types of information.

The SDN manager (100), executing the topology mapping module (110) and the GUI module (111), displays (block 602) the topology of the network (200) in the service flow GUI (301). The representation of the network as defined by the topology will identify the nodes (201 through 227) within the network (200) and their relationship using, for example, graphical elements with links between them representing how the nodes (201 through 227) are connected or otherwise related.

The SDN manager (100), executing the data flow monitoring module (113) and the GUI module (111), displays (block 603) information associated with a number of data flows via a flow list window (303). As described above, the displays a number of data flows within the network (200) displayed in the network topology window (302). As depicted in FIG. 3, a number of entries may be depicted in a table format to a user that informs the user of a number of data flows between nodes within the network (200). In each row of the table, the information conveyed within the flow list window (303) may include, for example, a flow number for a number of data flows, a status of a number of devices device, and a number of device names that identify the device that is represented in each of the rows. The table depicted in the flow list window (303) may also include information regarding an input port of each of the devices, a next node with which the node identified in a row is communicating with, an output port of each of the devices, and a match VLAN field that informs a user as to whether the VLAN for a selected data flow matches a VLAN configured on a physical device.

The method of FIG. 6 may proceed with displaying (block 406) information regarding a user-selected data flow within the flow list window (303). As described above, information of the parameters of the selected data flow may include, for example, a flow name, a match VLAN, and an amount of bandwidth available within the data flow path measured in, for example, megabytes, among other parameters of the data flow within the network (200).

The SDN manager (100), executing the data flow path determination module (112) and other modules (110, 111, 113), receives (block 605) a number of inputs from a user via the service flow GUI (301), and determines (block 606) a number of data flow paths from a first node to a second node within the network (200). As described above, the user may select the manual tab of the flow list window (303) and select a number of nodes (201 through 227) between a first and a second node through which the user wants data to transfer through.

In another example and as described above, the user may select the "auto" tab of the flow list window (303). Thus, the SDN manager (101) receives a user-selected indication, and determines (block 606), with the data flow path determination module (112), whether the user selected a shortest data flow path or an optimized data flow path. If the SDN manager (100) determines (block 606, determination Shortest) that the user wishes to use the shortest data flow path, then the SDN manager (100) uses (block 607) the data flow path between the two selected computing devices (223 through 227) that includes the fewest amount of hops, or, in other words, the lowest hop count. If, however, the SDN manager (100) determines (block 606, determination Optimized) that the user wishes to use the shortest data flow path, then the SDN manager (100) uses (block 608) the data flow path with the most bandwidth or the greatest data transfer speed. Executing the GUI module (111), the SDN manager (100) displays (block 609) the data flow path to the user. Further, the status of the selected shortest data flow path or optimized data flow path may be monitored by the SDN manager (100) executing the data flow monitoring module (113) as described above.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (101) of the SDN manager (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe an SDN manager and a method of determining a data flow path within a computing network. The specification and figures provide for determining a number of data flow paths between a first node and a second node within the computing network, and displaying the data flow paths to a user. This (title) may have a number of advantages, including: (1) providing an SDN manager that manages both a software-defined network (SDN) and traditional networking environments; (2) providing the ability to easily create paths and, in this manner, program the network without programming experience or resources; and (3) furthering of the adoption of SDNs in various different networking environments including, for example, datacenters and campuses.

The preceding description has been presented to illustrate and describe examples of the principles described. This description is not intended to be exhaustive or to limit these principles to any precise form disclosed. Many modifications and variations are possible in light of the above teaching.

What is claimed is:

1. A software-defined networking (SDN) manager, comprising:
   a processor; and
   a memory coupled to the processor, in which the memory comprises:
      a topology mapping module to map a topology of a computing network; and
      a data flow monitoring module to, when executed by the processor, determine a number of data flow paths through the topology based on a number of user-selected parameters;
      wherein the user-selected parameters comprise a selection of a first node, a second node, and an intermediate node intermediate to the first and second node and wherein the data flow monitoring module determines the number of data flow paths as the number of data flow paths pass through the intermediate node.

2. The SDN manager of claim 1, further comprising a graphical user interface (GUI) module to display a number of GUIs to a user; in which the GUI module displays a number of representations of the data flow paths in the GUIs.

3. The SDN manager of claim 2, in which the representations of the data flow paths comprise:
   a number of nodes; and
   a number of paths between the nodes,
   in which the first and second nodes represent a number of devices within the network and the paths represent communication paths between the devices.

4. The SDN manager of claim 2, in which the data flow paths represent an optimized data flow path, the optimized data flow path defining a data flow path within the network with the most available bandwidth.

5. The SDN manager of claim 4, in which the optimized data flow path is determined based on a number of bandwidth requirements of a number of applications executed within the network.

6. The SDN manager of claim 2, in which the data flow paths represent a shortest data flow path, the shortest data flow path defining a data flow path within the network with the least amount of hops between the first node and the second node.

7. The SDN manager of claim 2, in which the GUIs are displayed to a user on a display device coupled to the SDN manager.

8. The software-defined networking (SDN) manager of claim 1, wherein the data flow monitoring module further monitors a number of data flow paths and maintains isolation of any data flow paths such that data flow paths operating through the network do not overlap.

9. A computer program product for determining a number of data flow paths within a computing network, the computer program product comprising:
   a non-transitory computer readable storage medium comprising computer usable program code embodied therewith, the computer usable program code comprising:
      computer usable program code to, when executed by a processor, determine a number of data flow paths between a first node and a second node with the computing network;
      computer usable program code to, when executed by a processor, determine which of the number of data flow paths flow through a user selected intermediate node intermediate between the first node and second node; and
      computer usable program code to, when executed by a processor, determine an optimized data flow path, the optimized data flow path defining a data flow path within the network with the most available bandwidth, in which the optimized data flow path is determined based on bandwidth requirements of a number of applications executed within said network;
      computer usable program code to, when executed by a processor, determine a shortest data flow path, the shortest data flow path defining a data flow path within the network with the least amount of hops between the first node and the second node; and
      computer usable program code to, when executed by a processor, monitor the number of data flow paths and maintain isolation of any data flow paths such that data flow paths operating through the network do not overlap.

10. The computer program product of claim 9, further comprising computer usable program code to, when executed by a processor, display to a user the data flow paths.

11. The computer program product of claim 9, further comprising computer usable program code to, when executed by a processor, receive a user selection of the optimized data flow path or the shortest data flow path as a selected data flow path for communication between the first and second node.

12. The computer program product of claim 11, further comprising computer usable program code to, when executed by a processor, utilize the selected data flow path as the data flow path through which the first node and the second node communicate.

13. The computer program product of claim 9, further comprising computer usable program code to, when executed by a processor, communicate with and manage a number of devices in the computing network using a representational state transfer (REST) interface, the number of devices in the computing network communicating using OPENFLOW communication protocol.

14. A method of determining a data flow path within a computing network comprising:
with a processor executing a data flow path determination module, determining a number of data flow paths between a first node and a second node within the computing network; and
with the processor executing a graphical user interface (GUI) module, displaying the data flow paths to a user;
with the processor, determining an optimized data flow path;
with the processor, determining a shortest data flow path;
receiving a user selection of the optimized data flow path or the shortest data flow path as a selected data flow path for communication between the first and second node;
wherein, when the selection of the optimized data flow path is received, receiving a selection of a node intermediate to the first and second node through which the data flow determination module calculates the optimized data flow path.

15. The method of claim 14, in which the optimized data flow path defines one of the number of data flow paths within the network with the most available bandwidth, in which the optimized data flow path is determined based on bandwidth requirements of a number of applications executed within said network; and
the shortest data flow path defines a data flow path within the network with the least amount of hops between the first node and the second node.

16. The method claim 15, further comprising computer usable program code to, when executed by a processor, utilize the selected data flow path as the data flow path through which the first node and the second node communicate.

17. The method of claim 14, further comprising displaying a graphical user interface (GUI) indicating the number of selections of a number of nodes selected by the user and data flow parameters of the data flow path that the user selects.

18. The method of claim 14, further comprising communicating and managing a number of devices in the computing network using a representational state transfer (REST) interface, the number of devices in the computing network communicating using OPENFLOW communication protocol.

19. The method of claim 14, further comprising monitoring a number of data flow paths and maintaining isolation of any data flow paths such that data flow paths operating through the network do not overlap.

\* \* \* \* \*